Patented Jan. 4, 1927.

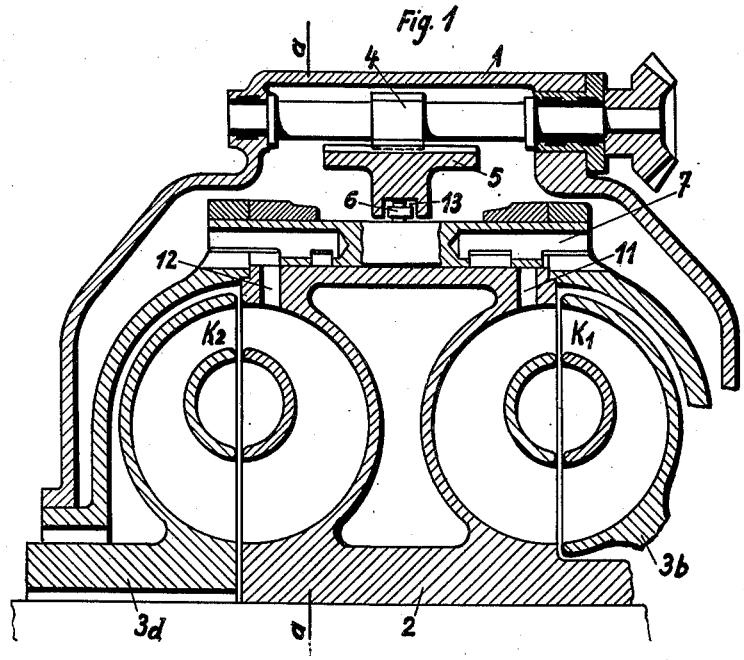
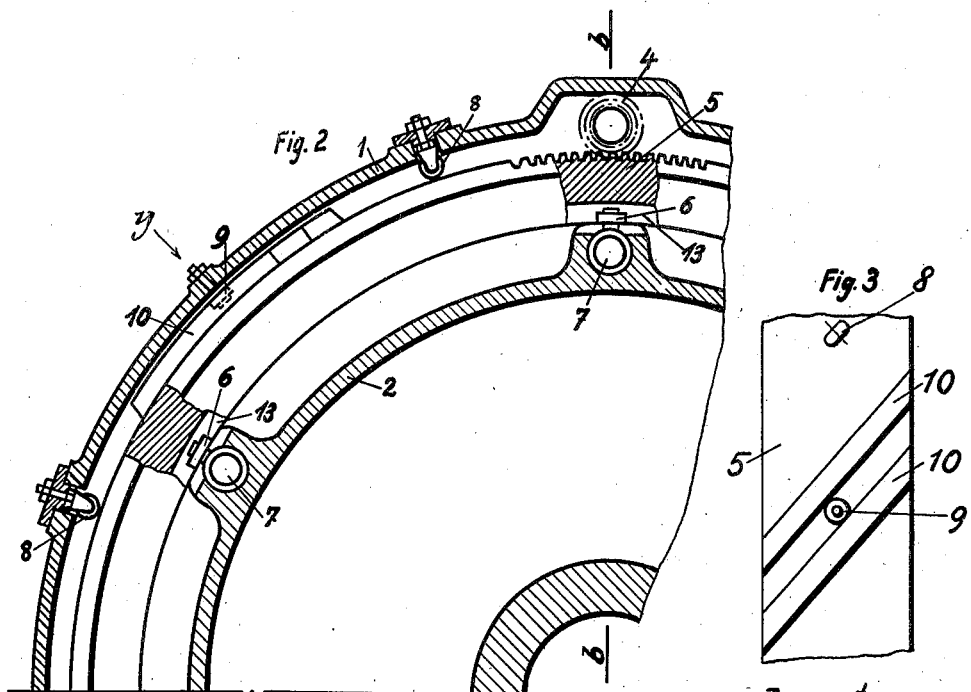
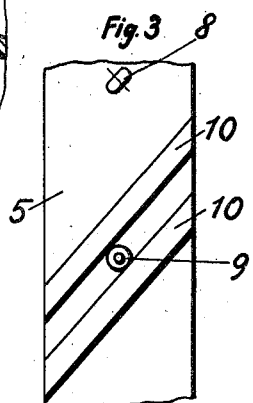

1,613,154

UNITED STATES PATENT OFFICE.

GUSTAV BAUER AND RUDOLF WÄLDE, OF HAMBURG, AND HANS KLUGE, OF HAMBURG-GROSS BORSTEL, GERMANY.

ARRANGEMENT FOR DRAINING THE CHAMBERS AND PASSAGES OF THE FLUID CIRCUITS OF FLUID GEARINGS AND FLUID COUPLINGS.

Application filed July 31, 1924, Serial No. 729,421, and in Germany January 8, 1924.

In maneuvering with fluid gearings and fluid couplings it is of great importance to drain the chambers and passages of the fluid circuits rapidly and entirely. For the purpose of draining said chambers and passages it has been the practice, hitherto, of arranging at the circumference of the chambers a number of apertures, that were kept open or closed by means of valves. With the valves open, the fluid was thrown out by centrifugal force, or with the gear at a standstill, any fluid remaining would run out. The mechanical operation of these valves presented great difficulties, and such were experienced also in the endeavour to close these valves, in working, with certainty and fully. For these reasons methods were adopted of closing and opening the valves by means of fluid pressure.

The present invention relates to means for securing the closure of the draining aperture in a manner at once simple and effective and consists in opening and closing the draining apertures at the circumference of the chambers by displacing a ring in a tangential and axial direction. Such ring is provided, at the outer circumference, with guide rails in which blocks or rolls engage, which are arranged at the gear casing. At the inner circumference the ring is provided with a slot in which blocks or rolls move, which are fitted to the drain slide valves.

In the drawing accompanying the specification and forming part thereof, a preferred modification embodying the principle of the invention has been represented as an example. In said drawing Fig. 1 is a section through the draining device on line b—b of Fig. 2; Fig. 2 is a cross section on line a—a of Fig. 1, and Fig. 3 is a detail view seen in the direction of the arrow y in Fig. 2. In the drawing Figures 1 to 3 disclose a draining device according to the present invention as arranged on two contiguous circuit chambers. $K^1$ and $K^2$ denote the two chambers; 1 is the fixed casing, 2 the secondary rotor, $3^a$ and $3^b$ the primary rotors; 4 denotes a spurwheel with a shaft and a bevel wheel; 5 the driving ring, 6 are the valve motion rolls, 7 the drain slide valves, 8 the supporting rollers, 9 the guide rollers for the driving ring, 10 the guide rails on the driving ring, 11 the drain holes of the chamber $K^1$, 12 the drain holes of the chamber $K^2$, 13 the slot of the driving ring.

The draining device is represented with the drain holes 11 closed by means of the slide valves 7, the drain holes 12 being open, however. The chamber $K^1$, is filled and is therefore thrown into gear, $K^2$ being drained empty, however, and therefore, thrown out of gear. If the spur wheel 4 engaging the toothed portion of the driving ring 5 is turned, the driving ring 5 will also turn, being supported on the rollers 8. Fitted to the outer circumference of the driving ring 5 are several oblique guide rails 10, which slide along the rolls, 9 fixed to the casing. When the driving ring 5 is turned, the guide rails slide along the rollers 9, and, in consequence of the oblique position of the guide rails, the driving ring 5 is displaced axially in one or the other sense according to the direction in which the driving ring is turned. In the driving ring 5 an annular slot 13 is provided running entirely around the driving ring. Into this slot 13 enter the rollers 6 arranged at the slide valve 7. These slide valves 7 are carried along when the adjusting or driving ring 5 is displaced radially and axially by means of the toothed segment. The draining slide valves 7 are bored hollow and are fitted with different overlappings. According to how these laps are adjusted both circuits may be opened or one or the other cycles may be closed. The rollers 8 are positioned parallel to the guide rails 10 and corresponding to the direction in which the driving ring is being turned.

We claim:

1. Arrangement for draining the chambers or passages of the fluid circuits of fluid gearings and fluid couplings comprising, in combination a fixed casing, a set of secondary and primary rotors operatively arranged in said casing, and a driving ring being laterally movable and surrounding said secondary rotor, said driving ring being slotted along the entire circumference of its inner face, draining valves adapted to be moved by means engaging in the slot of said ring, supporting rollers fitted to the inside of the said casing and, said ring being adapted to move forward and backward on said rollers, substantially as set forth.

2. Arrangement for draining the chambers or passages of the fluid circuits of fluid gearings and fluid couplings comprising, in combination a fixed casing, a set of secondary and primary rotors operatively arranged in said casing, and a driving ring being laterally movable and surrounding said secondary rotor, said driving ring being slotted along the entire circumference of its inner face, draining valves adapted to be moved by means engaging in the slot of said ring, supporting rollers fitted to the inside of the said casing, guide rollers fitted to the inside of said casing, guide rails fitted in pairs obliquely on the outer face of said driving ring, said guide rollers being adapted to engage into the several pairs of said guide rails, substantially as set forth.

3. Arrangement for draining the chambers or passages of the fluid circuits of fluid gearings and fluid couplings comprising, in combination a fixed casing, a set of secondary and primary rotors operatively arranged in said casing, and a driving ring being laterally movable and surrounding said secondary rotor, said driving ring being slotted along the entire circumference of its inner face, draining valves adapted to be moved by means engaging in the slot of said ring, supporting rollers fitted to the inside of the said casing, guide rollers fitted to the inside of said casing, guide rails fitted in pairs obliquely on the outer face of said driving ring, a spur wheel with shaft and bevel wheel, said spur wheel being adapted to engage into a toothed segmental portion of said driving ring and to move said ring forward and backward, substantially as set forth.

4. Arrangement for draining the chambers or passages of the fluid circuits of fluid gearings and fluid couplings comprising, in combination, a fixed casing, a set of secondary and primary rotors, and a driving ring being laterally movable and slotted along the entire circumference of its inner face, supporting with shaft and bevel wheel, drain slide valves adapted to be moved laterally by means engaging in the slot of said ring, said valves being positioned intermediate the said secondary rotor and the said driving ring and adapted to control the drain holes of said cycles, said means comprising valve motion rollers revolvably arranged on said drain slide valves and adapted to engage into the slotted driving ring, substantially as set forth.

5. Arrangement for draining the chambers or passages of the fluid circuits of fluid gearings and fluid couplings, comprising, in combination, a fixed casing, a set of secondary and primary rotors operatively arranged in the said fixed casing, and a driving ring being laterally movable and surrounding said secondary rotor, said driving ring being slotted along the entire circumference of its inner face, valve motion rollers and drain slide valves being operatively connected with said driving ring and adapted to be moved in lateral direction by the same, substantially as set forth.

6. Arrangement for draining the chambers or passages of the fluid circuits of fluid gearings and fluid couplings, comprising, in combination, a fixed casing, a set of secondary and primary rotors operatively arranged in said casing, and a driving ring being laterally movable and surrounding said secondary rotor, said driving ring being slotted along the entire circumference of its inner face, draining valves adapted to be moved by means engaging in the slot of said ring, supporting rollers fitted to the inside of the said casing, guide rollers fitted to the inside of said casing, guide rails fitted in pairs, obliquely on the outer face of said driving ring, said guide rollers engaging with the said oblique guide rails, and a spur wheel engaging with said driving ring and adapted to move the same forward or backward, so that the driving ring rigidly connected to the said guide rails will be displaced sideways in accordance with the movement of said spur wheel, substantially as set forth.

7. Arrangement for draining the chambers or passages of the fluid circuits of fluid gearings and fluid couplings, comprising, in combination, a fixed casing, a set of secondary and primary rotors operatively arranged in said casing, and a driving ring movably surrounding said secondary rotor, said driving ring being slotted along the entire circumference of its inner face, supporting rollers fitted to the inside of the said casing, guide rollers fitted to the inside of said casing, guide rails fitted in pairs obliquely on the outer face of said driving ring, said guide rollers engaging with the said oblique guide rails and a spur wheel engaging with said driving ring and adapted to move the same forward or backward, and drain slide valves being operatively connected to said driving ring, so that the said driving ring and the drain slide valves will be displaced sideways when being actuated by means of said spur wheel, substantially as set forth.

In testimony where we affix our signatures.
DR. GUSTAV BAUER.
RUDOLF WÄLDE.
HANS KLUGE.